Dec. 2, 1924. 1,517,497
J. DITSON
BLOWGUN FOR DRILL SHARPENERS
Filed Nov. 29, 1921
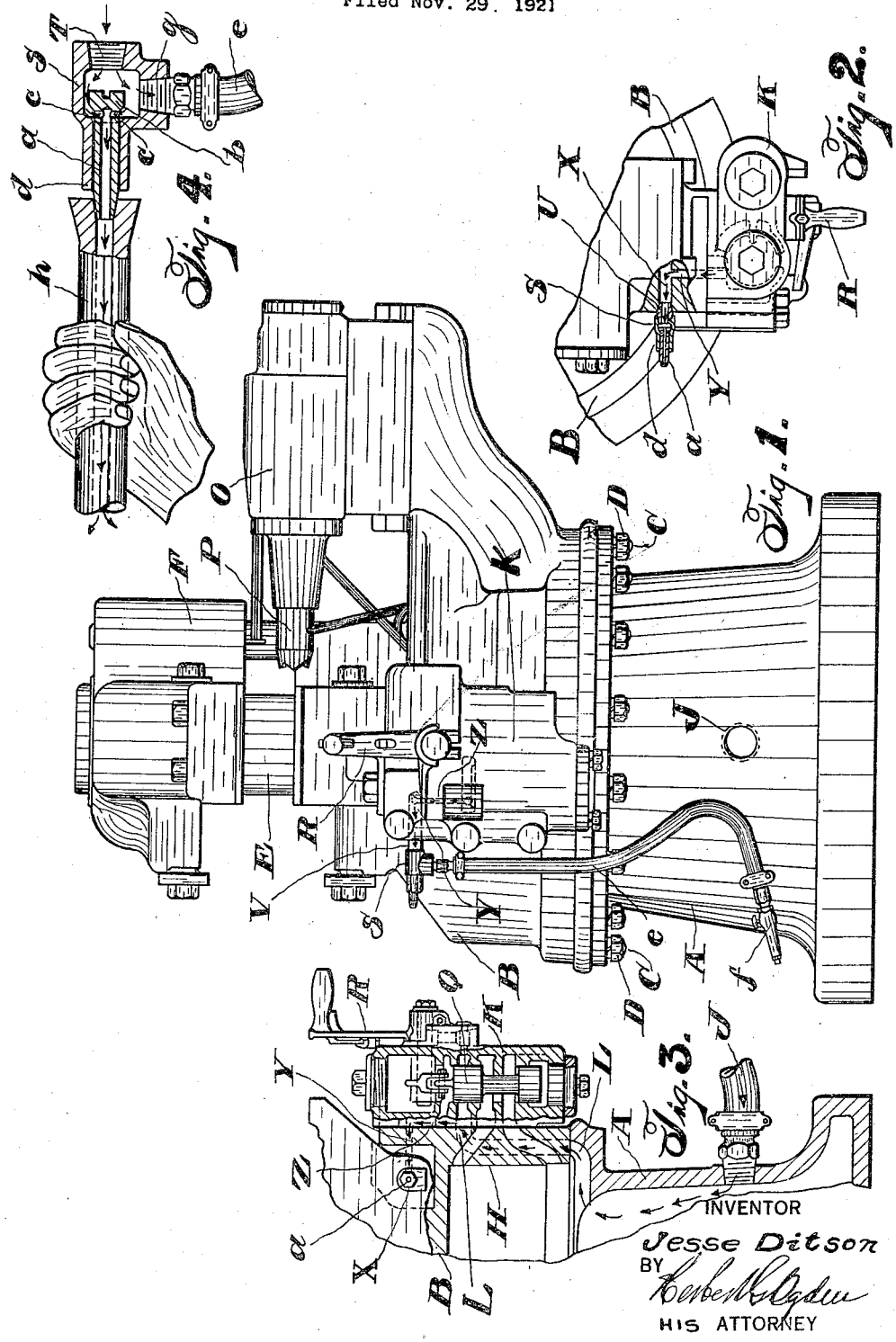
INVENTOR
Jesse Ditson
BY
Herbert M. Ogden
HIS ATTORNEY Patented Dec. 2, 1924.

1,517,497

UNITED STATES PATENT OFFICE.

JESSE DITSON, OF LITTLETON, COLORADO, ASSIGNOR TO INGERSOLL-RAND COMPANY, OF JERSEY CITY, NEW JERSEY, A CORPORATION OF NEW JERSEY.

BLOWGUN FOR DRILL SHARPENERS.

Application filed November 29, 1921. Serial No. 518,735.

*To all whom it may concern:*

Be it known that I, JESSE DITSON, a citizen of the United States, and a resident of Littleton, county of Arapahoe, and State of Colorado, have invented a certain Blowgun for Drill Sharpeners, of which the following is a specification, accompanied by drawings.

This invention relates to drill sharpeners but more particularly to a blow gun forming a part of the machine for blowing out hollow articles.

A drill sharpener of the type to which my blow gun is conveniently applied, is disclosed in my co-pending application Serial No. 498,212, filed September 3, 1921, although the device may be used with other types of machine when found applicable.

The objects of the invention are to improve upon and simplify the blow gun device, so that the blow gun may conveniently be formed as a unitary portion of a self-contained drill sharpener by locating all the supply passages for the device wholly within the machine. The only exposed portion of the device will then be the blow gun nipple, against which the end of the hollow article is held to release the fluid pressure for blowing.

To these ends the invention consists of the device illustrated in the accompanying drawings, in which—

Figure 1 is a side elevation of a sharpening machine having my device applied thereto, only so much of the machine being shown as will serve to illustrate the invention.

Figure 2 is a detail top plan view of the valve chest partly in horizontal section through the blow gun.

Figure 3 is a detail vertical sectional view through the valve chest, and

Figure 4 is an enlarged detail horizontal sectional view through the blow gun showing the mode of operation.

Referring to the drawings, the machine comprises the base A having the main cylinder frame B suitably secured thereto as by means of the studs C and nuts D. A cross head rod E is movable vertically in the main cylinder frame B and carries a cross head F at its upper end and a piston (not shown) at its lower end, operating in the cylinder bore H.

Motive fluid, as air under pressure, is admitted to the hollow base A, which forms a constantly supplied reservoir, through the inlet J and is led to the throttle valve K through the supply passage L. The movements of the cross head F and the operation of the dolly cylinder O and dolly P are controlled by the throttle valve Q operating in the valve chest K and actuated by the pivoted valve handle R operatively connected to the throttle valve Q in any suitable manner.

The blow gun comprises a casing or connection S having a screw threaded rearward opening T on its longitudinal axis for connection to a nipple U adapted to be screwed into or otherwise rigidly connected directly to the outside of the frame of the machine at the outlet X which is connected by the passage Y in the frame and the passage Z in the valve chest, to the main supply passage L, so that the only portion of the device, or its supply conduits, which is exposed, consists of the casing S and the parts connected directly thereto externally, the supply passages being internal passages.

An elongated nozzle $a$ having the inner head $b$ and the radial ports $c$ at the base of the head is movable longitudinally within the forward reduced guide neck $d$ of the casing S and if desired a hose $e$ having another blow gun $f$ at its end, may be connected to the opening $g$ of the blow gun casing S. The nozzle $a$ as shown is adapted to be inserted in the casing S from the rear through the opening T so that the head $b$ lies within the central cavity of the casing and the radial ports $c$ are controlled by the longitudinal movement of the nozzle $a$.

In the operation of the device, the operator grasps the hollow drill steel $h$, or other hollow article, and forcibly applies one end against the nozzle $a$ to move said nozzle inwardly in the casing S and thus opening the ports $c$ at the base of the nozzle to permit fluid pressure from the reservoir A to pass through the nozzle into the hollow article. Upon removing endwise pressure from the nozzle $a$ the fluid pressure against the nozzle head $b$ immediately forces the nozzle outwardly again and closes the ports $c$.

The blow gun, in accordance with my invention may be considered a permanent part of the drill sharpener and is not liable to become broken or get out of order, because all of the supply passages for the blow gun are enclosed and protected within the body of the machine. The only exposed parts are the casing S and nozzle $a$ and if either one of these become lost or broken, they may readily be replaced at small cost. The blow gun is constantly supplied with fluid pressure from the reservoir and is operable at all times during the operation of the drill sharpening machine.

I claim:

A blow gun for fluid actuated drill sharpeners, adapted to be mounted on the outside of the frame of the machine and in constant communication with the source of pressure fluid of the machine through internal passages located wholly within the machine, said blow gun comprising a casing having a rearward opening for connection to the machine frame, a reduced guide neck at the opposite end, and a nozzle slidable in the guide neck and having an enlarged head located in the central cavity of the casing subjected to the pressure fluid in the casing, said nozzle having ports controlled by the longitudinal movement of the nozzle.

In testimony whereof I have signed this specification.

JESSE DITSON.